Feb. 8, 1949. A. T. WRIGHT 2,461,248
VEHICLE CHOCKING DEVICE
Filed Jan. 16, 1947
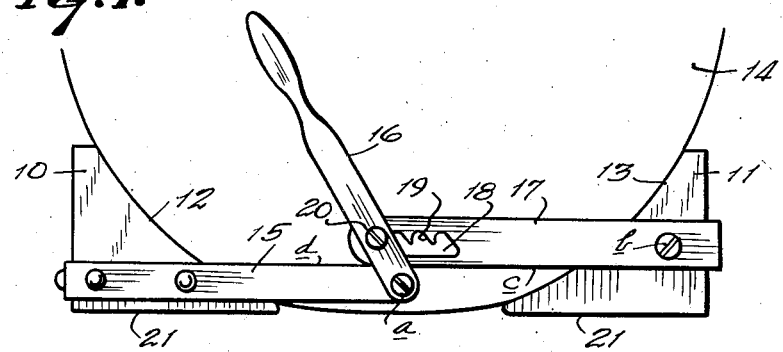
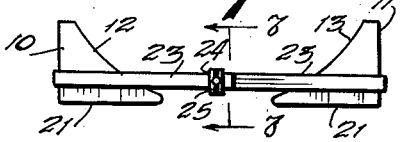
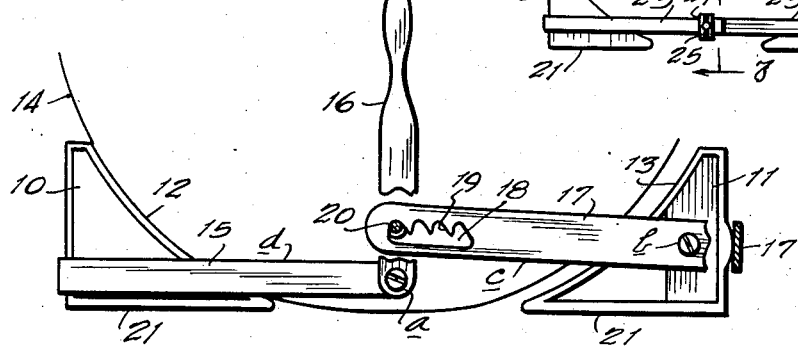
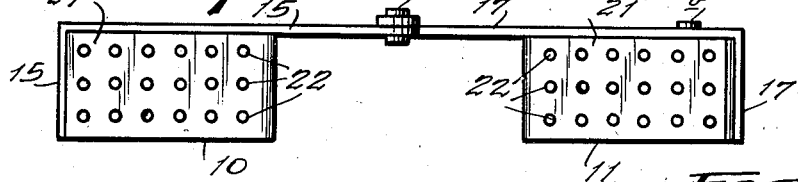
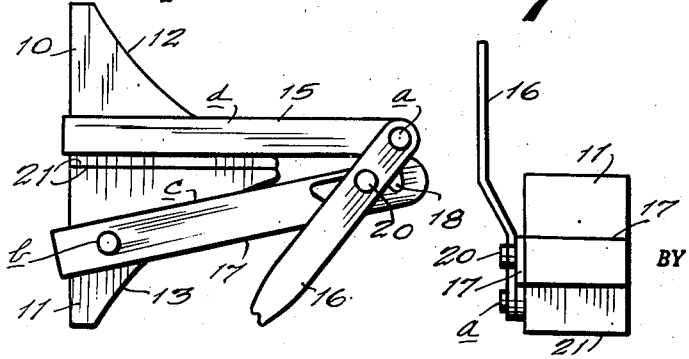
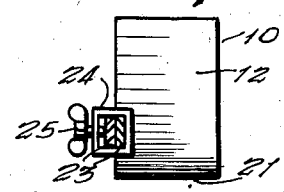
ALVA T. WRIGHT
INVENTOR.
BY
ATTORNEY Patented Feb. 8, 1949

2,461,248

UNITED STATES PATENT OFFICE 2,461,248

VEHICLE CHOCKING DEVICE

Alva T. Wright, Fort Worth, Tex.

Application January 16, 1947, Serial No. 722,429

1 Claim. (Cl. 188—32)

This invention relates to chocking devices for vehicle wheels, or the like, and it has particular reference to apparatus employed for securing the wheels of motor vehicles against voluntary movement on inclines, or the like, and the principal object of the invention resides in the provision of a combination of elements which afford a convenient means for stabilizing a vehicle, such as an automobile or truck, while one or more of the wheels are raised by a jack, or similar device, in tire-changing operations.

Another object of the invention is that of providing apparatus which is simple and economical in structure and sufficiently compact as to be conveniently carried in a tool compartment of the vehicle for ready use at all times.

A still further object of the invention is manifest in the provision of a safety device by which vehicles, parked along streets and roadways, can be secured against voluntary or accidental movement when brakes have not been set, or in event of failure of the brakes, and thus minimize the hazard of street and highway accidents.

Broadly, the invention seeks to comprehend the provision of a chocking device capable of adaptation to use in stabilizing all types of vehicles, including aircraft, and contemplates an adjustable arrangement whereby the same can be utilized on different size wheels thus affording a relatively flexible accessory for operators of all types of motor vehicles.

While the foregoing objects are paramount, other and lesser objects will become manifest as the description proceeds, taken in connection with the appended drawings wherein:

Figure 1 illustrates one form of the invention as applied to a vehicle wheel, showing the adjustable latching device.

Figure 2 shows the invention about to be adjusted to operative position, portions being shown cut away to illustrate the flexible and adjustable features of the invention.

Figure 3 is an inverted plan view of the invention showing the ground engaging surface of the chocking members and the operative relationship of the latter.

Figure 4 shows the invention in collapsed position for convenient portability or storage.

Figure 5 is an end elevational view of the invention.

Figure 6 is a front elevational view of the invention, illustrating another form of adjustable securing device, and Figure 7 is a transverse sectional view, taken on lines 7—7 of Figure 6, illustrating the securing device for the chock members.

Accordingly, the invention comprises a pair of substantially wedge-shaped chock blocks 10 and 11 which are adjustably spaced and have opposing inwardly curved operative surfaces 12 and 13 conformable to the tread of a wheel 14, as illustrated in Figure 1. In one form of the invention the chock block 10 has an arm 15 rigidly attached thereto which extends beyond the operative face 12 thereof, as in Figures 1 and 2, and has a lever 16 pivoted to its free end at $a$. The opposite block 11 has a link 17 pivotally secured thereto at $b$ which extends horizontally beyond its operative face 13 and slightly beyond the end of the arm 15 of the block 10.

The link 17 has its lowermost edge $c$ in a plane with the upper edge $d$ of the arm 15 so as to slidably engage the latter along its upper edge $d$ and be capable of lapping. A longitudinal slot 18 is formed in the end of the link 17 and has a plurality of spaced ratchet teeth 19 formed along its upper side engageable by a pin 20, on the lever 16 near its pivot $a$. The lever 16, when manipulated, can be utilized to draw the blocks 10 and 11 toward and against the wheel tread 14 and secure the wheel in the position illustrated in Figure 1.

It is desirable that the arm 15 be so constructed as to be passed about the end of the block 10 opposite the operative face 12 thereof to afford greater rigidity and minimize side pull exerted upon the blocks 10 and 11 when the linkage assembly is operated. Similarly, the link 17 extends about the end of the block 11 opposite its operative face 13, sufficient clearance being provided to permit suitable movement of the link 17 on its pivot $b$, as shown in Figure 2.

It is contemplated that the blocks 10 and 11 may be of metal, wood, or other suitable material, and should have their ground engaging surfaces 21 perforated or fluted to prevent slippage which might result in disengagement of the blocks from the tread 14. In Figure 3 is shown a plurality of uniformly arranged perforations 22 which will serve to provide a suitable ground gripping device.

The invention, as illustrated in Figure 4, may be collapsed or folded by arranging the blocks 10 and 11 so that their ground engaging surfaces 21 are joined, operating the assembly on the pivot $a$ between the arm 15 and lever 16.

A modified arrangement of the invention is shown in Figures 6 and 7 in which each of the blocks 10 and 11 have identical arms 23 rigidly secured thereto, much in the same manner that the arm 15 is secured to the block 10, and these members are slidably lapped, as shown in Figure 7, and secured by a clamp 24 held by a thumbscrew 25. The arms 23 are thus adjustably extensible and provide for variable spacings of the blocks 10 and 11.

Manifestly, the structure herein shown and described is capable of considerable changes and modifications by persons skilled in the art without departing from the spirit and intent of the invention or the scope of the appended claims.

What is claimed is:

In a chocking device for chocking vehicle wheels, or the like, in combination, a pair of substantially wedge-shaped members having inwardly curved operative faces conformable to a wheel tread in opposing arrangement thereagainst, an arm rigidly attached to one side of one of said members and extending horizontally beyond the operative face thereof, a lever pivoted at its lower end to the end of said arm, a link pivotally attached to the opposite member in a plane above said arm and extending toward the latter, a toothed slot in the free end of said link, and means on said lever engageable with the teeth in said slot adjustably latching said arm to said link.

ALVA T. WRIGHT.

REFERENCES CITED

The following references are of record in the file of this patent:

FOREIGN PATENTS

| Number | Country | Date |
| --- | --- | --- |
| 452,251 | France | Mar. 3, 1913 |
| 675,784 | France | Nov. 8, 1929 |